(12) United States Patent
Margiloff et al.

(10) Patent No.: US 7,593,868 B2
(45) Date of Patent: Sep. 22, 2009

(54) SYSTEMS AND METHODS FOR PROVIDING CONTEXTUAL ADVERTISING INFORMATION VIA A COMMUNICATION NETWORK

(75) Inventors: William A. Margiloff, New York, NY (US); Keith M. Dallara, New York, NY (US); Christopher J. Hansen, Brooklyn, NY (US)

(73) Assignee: Innovation Interactive LLC, New York, NY (US)

( * ) Notice: Subject to any disclaimer, the term of this patent is extended or adjusted under 35 U.S.C. 154(b) by 321 days.

(21) Appl. No.: 10/767,123

(22) Filed: Jan. 29, 2004

(65) Prior Publication Data

US 2004/0186777 A1    Sep. 23, 2004

Related U.S. Application Data

(60) Provisional application No. 60/443,513, filed on Jan. 29, 2003, provisional application No. 60/443,512, filed on Jan. 29, 2003, provisional application No. 60/443,511, filed on Jan. 29, 2003.

(51) Int. Cl.
*G06Q 30/00* (2006.01)
(52) U.S. Cl. ............................. 705/26; 705/14
(58) Field of Classification Search .................. 705/14, 705/26, 27
See application file for complete search history.

(56) References Cited

U.S. PATENT DOCUMENTS

| | | | |
|---|---|---|---|
| 5,644,737 A | | 7/1997 | Tuniman et al. |
| 5,809,242 A | | 9/1998 | Shaw et al. |
| 5,838,790 A | | 11/1998 | McAuliffe et al. |
| 5,913,040 A | * | 6/1999 | Rakavy et al. ............... 709/232 |
| 5,948,061 A | | 9/1999 | Merriman et al. |
| 6,014,502 A | | 1/2000 | Moraes |
| 6,098,065 A | * | 8/2000 | Skillen et al. .................. 707/3 |
| 6,157,946 A | | 12/2000 | Itakura et al. |
| 6,199,106 B1 | | 3/2001 | Shaw et al. |
| 6,311,211 B1 | | 10/2001 | Shaw et al. |
| 6,351,745 B1 | | 2/2002 | Itakura et al. |
| 6,463,468 B1 | | 10/2002 | Buch et al. |
| 6,490,602 B1 | | 12/2002 | Kraemer |
| 6,876,974 B1 | * | 4/2005 | Marsh et al. ................... 705/14 |
| 2002/0059116 A1 | * | 5/2002 | Bulatovic et al. ............. 705/27 |
| 2005/0096983 A1 | * | 5/2005 | Werkhoven ................... 705/14 |
| 2007/0022010 A1 | * | 1/2007 | Blaser et al. .................. 705/14 |

OTHER PUBLICATIONS

Jennifer Beauprez, Denver Post, Denver,Colo.: Apr. 24, 2000, p. E.01 http://proquest.umi.com/pqdweb?did=52916508&sid=4&Fmt=3&clientId=19649&RQT=309&VName=PQD.*

(Continued)

*Primary Examiner*—Jeffrey A. Smith
*Assistant Examiner*—Mila Airapetian
(74) *Attorney, Agent, or Firm*—Buckley, Maschoff & Talwalkar LLC

(57) ABSTRACT

According to some embodiments, systems and methods are provided to display contextual advertising information to a user via a communication network.

11 Claims, 6 Drawing Sheets

OTHER PUBLICATIONS

Sherman, Chris, "Dogpile's Toolbar Fetches More than Search Engine Results", Jun. 25, 2003, SearchEngineWatch.com. Retrieved from Internet: URL:<http://searchenginewatch.com/searchday/article.php/2226141 >, 5pgs.

Edelman, Benjamin, "Documentation of Gator Advertisements and Targeting", Berkman Center for Internet & Society, Harvard Law School, last updated Jun. 7, 2003. Retrieved from Internet: URL: < http://cyber.law.harvard.edu/people/edelman/ads/gator >, 5pgs.

Google™ AdWords—It's All About Results™. Retrieved from Internet: URL: < https://adwords.google.com/select/pricing.html >, © 2004 Google, 5pgs.

Löffler, Alexander, "'BonziBUDDY' as an example of an intelligent software agent", University Of Applied Sciences, Zweibrücken, pp. 1-4.

* cited by examiner

SYSTEMS AND METHODS FOR PROVIDING CONTEXTUAL ADVERTISING INFORMATION VIA A COMMUNICATION NETWORK

CROSS-REFERENCE TO RELATED APPLICATIONS

The present application claims priority under 35 U.S.C. § 119(e) to (i) U.S. Provisional Patent Application No. 60/443, 511 entitled "Systems and Methods for Providing an Improved Toolbar," (ii) U.S. Provisional Patent Application No. 60/443,513 entitled "Systems and Methods for Providing Locally Determined Contextual Advertising Information via a Communications Network," and (iii) U.S. Provisional Patent Application No. 60/443,512 entitled "Systems and Methods For Selecting Graphical Advertisements To Be Provided To Users via a Communication Network," all filed in the name of Margiloff et al. on Jan. 29, 2003. The present application is also related to (i) U.S. patent application Ser. No. 10/766,964 entitled "Systems and Methods for Providing an Improved Toolbar" and (ii) U.S. patent application Ser. No. 10/767,242 entitled "Systems and Methods for Selecting Advertisements To Be Provided To Users via a Communication Network," filed concurrently herewith. The entire contents of these applications are incorporated herein by reference.

FIELD

The present invention relates to advertising information. In particular, the present invention relates to systems and methods for providing contextual advertising information via a communication network.

BACKGROUND

It is known that contextual advertising information can be locally determined for a user. For example, a local advertising application can execute at a user's Personal Computer (PC) while he or she accesses web sites. These advertising applications may, for example, select an advertisement to be displayed to the user based on a Uniform Resource Locator (URL) address associated with a web page that the user is currently viewing. Some advertising applications display advertisements to a user while the user is "offline". In other words, advertisements may also be locally determined and/or displayed during periods in which a user may not be connected to the Internet.

It might be the case, however, that the selected advertisement should not be displayed to that particular user. In other words, although an advertisement may be contextual (e.g., related to the current URL being visited by a user), the advertisement may not be appropriate. For example, the advertisement might be associated with a restaurant in New York City—but the user might currently be in California. Similarly, the user might have recently seen an advertisement for the same product or service. In some cases, the user may have even already purchased the item being advertised.

Moreover, the user might not realize that the advertisement is being provided by a third party (i.e., a party not necessarily associated with the web page he or she is currently viewing). In existing systems, for example, a user might be confused as to whether an advertisement is associated with a particular web site, URL, corporation, or other entity.

DETAILED DESCRIPTION

Some embodiments described herein are associated with "advertising information." As used herein, the term "advertising information" may refer to, for example, an advertisement for a product and/or service, a coupon, or any other commercial information that is provided to a user (e.g., including text, graphical, audio, video, and/or executable information). In some embodiments, advertising information may include, for example, product information, press releases, articles, opinions, testimonials, and/or commercials. In some embodiments advertising information may be "contextual". As used herein, the term "contextual", as used within the term "contextual advertising information", may generally refer to any advertising information that is related to, connected to, linked to, correlated to, bears resemblance to, and/or is otherwise associated with a user, a user's actions, a user device, and/or any other characteristic associated with an intended recipient of the advertising material.

In addition, some embodiments are associated with "devices" such as a "user device" or an "advertiser device". As used herein, the term "device" (and various derivatives such as "user device", etc.) may generally refer to any device that can communicate via a network. Examples of devices include a Personal Computer (PC), a workstation, a server, a printer, a scanner, a facsimile machine, a copier, a Personal Digital Assistant (PDA), a storage device (e.g., a disk drive), a hub, a router, a switch, and a communication device (e.g., a modem, a wireless phone, etc.). In some embodiments, devices may comprise one or more device components. As used herein, the term "device component" may refer to a device, or a component, piece, portion, or combination of devices. Examples of device components may include a Static Random Access Memory (SRAM) device or module, a network processor, and a network communication path, connection, port, or cable.

System Overview

Figure 1:
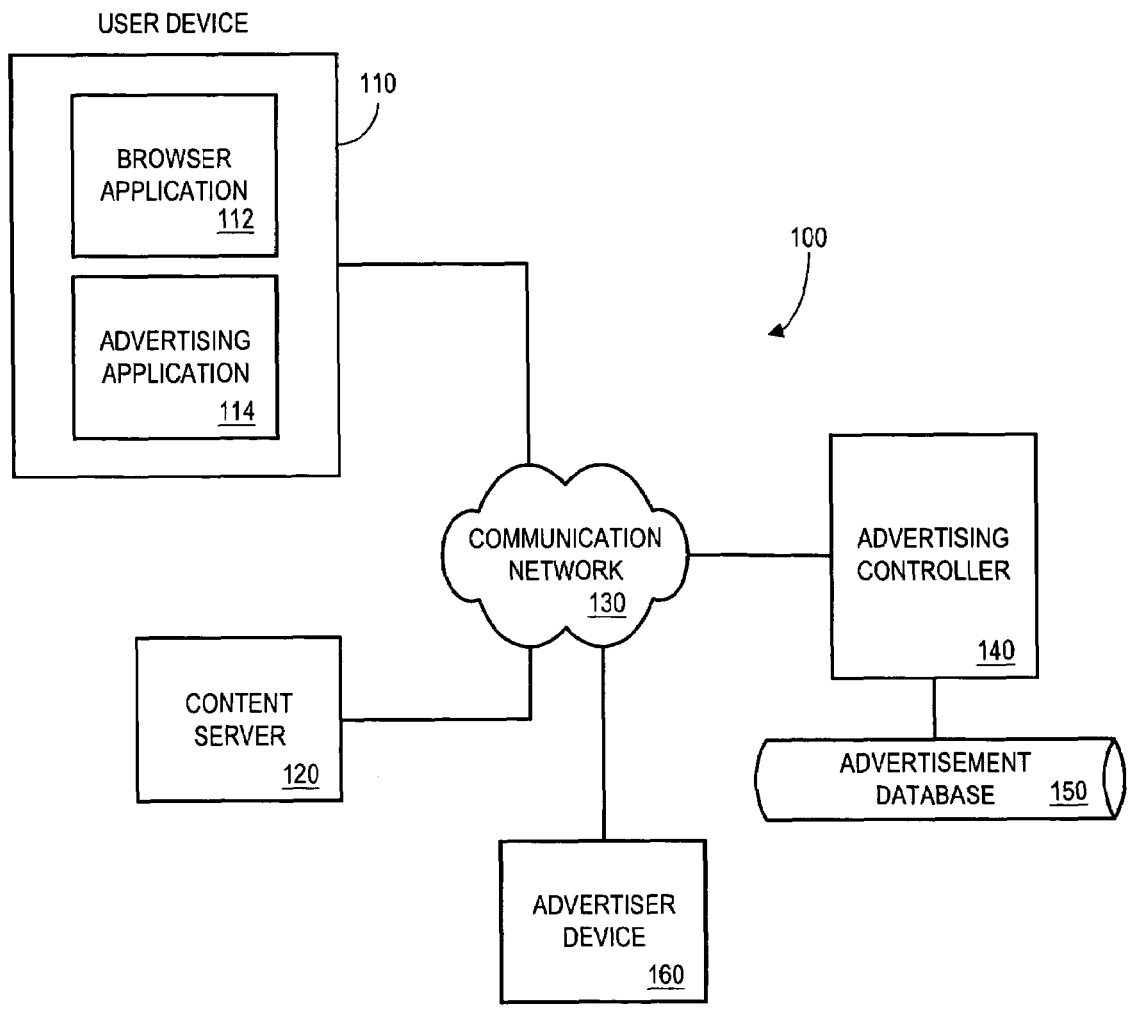
FIG. 1 is a block diagram overview of a system according to some embodiments.

Referring first to FIG. 1, a block diagram of a system 100 according to some embodiments is depicted for use in explanation, but not limitation, of described embodiments. Upon reading this disclosure, those skilled in the art will appreciate that different types, layouts, quantities, and configurations of systems may be used.

In some embodiments (such as shown in FIG. 1), the system 100 may include one or more user devices 110 that may, for example, execute a browser application 112 (e.g., the INTERNET EXPLORERS ® browser application available from MICROSOFT®) and/or an advertising application 114. The browser application 112 may be used, according to some embodiments, to access information from a content server 120 via a communication network 130. For example, a user may utilize the browser application 112 to access web pages provided by one or more content servers 120 via the Internet (e.g., communications network 130). According to some embodiments, the browser application 112 may be or include a software application that executes within the user device 110 (as shown in FIG. 1). In some embodiments, the browser application 112 may reside external to the user device 110 and may, for example, be accessible to the user device 110 via the communication network 130 and/or another communication network (not shown).

According to some embodiments, the user device 110 may execute an advertising application 114 that may, for example, receive information from an advertising controller 140 (e.g., via the communication network 130). For example, the advertising controller 140 may access information in an advertisement database 150 and transmit that information to the advertising application 114. In some embodiments for example, a user may install the advertising application 114 on the user device 110. The advertising application 114 may, on a periodic basis for example, request updates and/or advertising information from the advertising controller 140. The advertising controller 140 may, according to some embodiments, access a lookup table and/or other information store such as the advertisement database 150 and send various forms of advertisements and/or other advertising information to the user device 110 and/or the advertising application 114.

The advertising information, according to some embodiments, may include advertisement content and/or an associated advertisement rule. For example, the advertisement rule may indicate that a particular advertisement should be displayed to the user whenever he or she searches for the word "tires" via a search engine. In some embodiments, the advertising rule may be directed to providing a user with contextual advertising information. For example, an advertisement for tire repair or other tire-related information may be provided to the user in response to the user's search for "tires". In other words, it may be assumed in some embodiments that because the user is searching for "tires", that the user may be interested in various aspects relating to tires.

In some embodiments, the user device 110 (and/or advertising application 114) may not receive the advertisement itself from the advertising controller 140. For example, the advertisement information sent to the user device 110 might represent information that can be used by the advertising application 114 to access the advertisement. According to some embodiments for example, the advertising application 114 may use the advertising information to download and/or otherwise access a file from an advertiser device 160 (e.g., via communications network 130). For example, the information provided to the advertising application 114 may be or include a hyperlink that points to a URL associated with one or more web pages provided by the advertiser device 160 and/or a content server 120. In some embodiments, the advertiser device 160 may be or include a content server 120. According to some embodiments, the advertiser device 160 may be or include the advertising controller 140 and/or the advertisement database 150.

As used herein, devices (such as the user device 110 and the content server 120) may communicate via the communication network 130, such as a Local Area Network (LAN), a Metropolitan Area Network (MAN), a Wide Area Network (WAN), a proprietary network, a Public Switched Telephone Network (PSTN), a Wireless Application Protocol (WAP) network, a cable television network, or an Internet Protocol (IP) network such as the Internet, an intranet or an extranet. Note that the devices shown in FIG. 1 need not be in constant communication. For example, the user device 110 may only communicate with the content server 120 via the Internet on an as-needed basis. In some embodiments, for example, the user device 110 may be a PC that intermittently utilizes a dial-up connection to the Internet via an Internet Service Provider (ISP). In other embodiments, the user device 110 may be in constant and/or high-speed communication with the content server 120 and/or with other devices through the use of any known or available connection device such as a cable or Digital Subscriber Line (DSL) modem. According to some embodiments, the communication network 130 may be or include multiple networks of varying type, configuration, size, and/or functionality.

The user device 110, the content server 120, the advertising controller 140, and the advertiser device 160, may be any devices capable of performing the various functions described herein. The user device 110 may be, for example: a PC, a portable computing device such as a PDA, an interactive television device, or any other appropriate storage and/or communication device. Any or all of the content server 120, the advertising controller 140, and the advertiser device 160 may be, for example, a web server that provides web pages for the browser application 112 and/or that provides advertising information for the advertising application 114.

Although a single user device 110, content server 120, advertising controller 140, and advertiser device 160 are illustrated in FIG. 1, any number of these devices may be included in the system 100. Similarly, any number of other devices known, available, and/or described herein may be included in the system 100 according to some embodiments. A single content server 120 may, for example, be in communication with multiple user devices 110. In some embodiments, multiple content servers 120 may provide various information such as advertisements and/or web pages to one or more user devices 110. In some embodiments, a single device may include the functionality of one or more of the devices described herein. For example, a single web server may operate as a content server 120, an advertising controller 140, and/or an advertiser device 160.

Local Contextual Advertising Method

Figure 2:
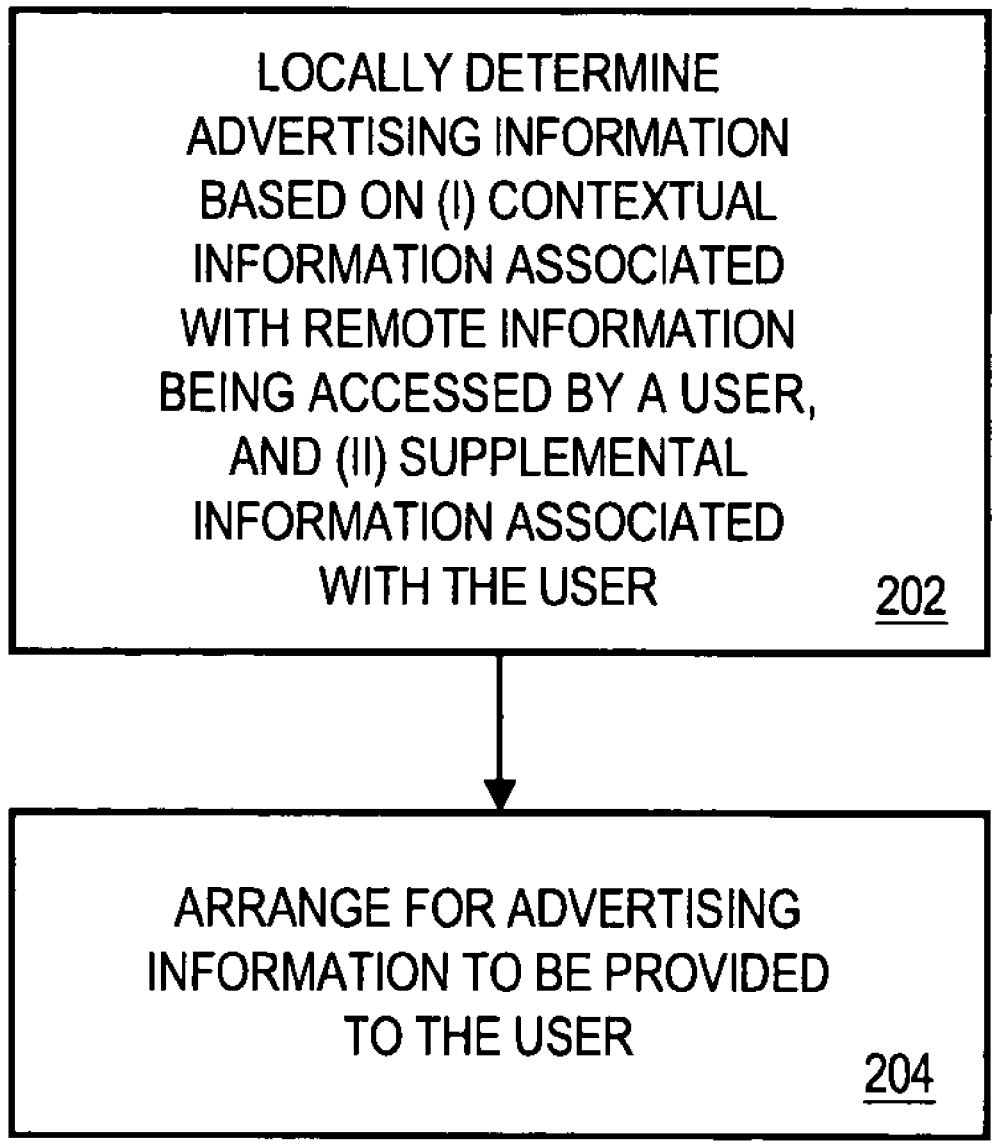
FIG. 2 is a flow chart of a method according to some embodiments.

Turning now to FIG. 2, a flow chart of a method 200 according to some embodiments is shown. The flow diagrams described herein do not necessarily imply a fixed order to the actions, and embodiments may be performed in any order that is practicable. Note that any of the methods described herein may be performed by hardware, software (including microcode), firmware, or any combination thereof. For example, a storage medium may store thereon instructions that when executed by a machine result in performance according to any of the embodiments described herein. The method 200 shown in FIG. 2 may be performed, for example, by the advertising application 114 executing at the user device 110 (both as described above in conjunction with system 100).

In some embodiments, the method 200 may begin, at 202, by locally determining advertising information based on (i) contextual information associated with remote information being accessed by a user, and (ii) supplemental information associated with the user. In other words, the advertising information may be determined based on both "contextual" and "supplemental" information. The determination, according to some embodiments, may be "local" in that it is performed local to a user (e.g., at the user device 110). For example, the determination may be performed by the advertising application 114 described in conjunction with FIG. 1 herein. In some embodiments, the information being accessed by the user may be "remote" in that it is not stored at the user device 110 (e.g., the user may be accessing a web page from a content server 120).

According to some embodiments, the "contextual" information may be used to select an advertisement to be served to the user (e.g., the advertisement might be selected due to a match of a search query, content on a Web page, and/or a URL string). In some embodiments, the advertising information might be an advertisement selected based on a keyword in a web page currently being viewed by a user (or the Web page's URL address). For example, a coupon for a Laundromat may be selected when a user visits a web site having a URL, title, heading, and/or other indicator associated with washer or dryer repair. In some embodiments it may be assumed, for example, that if the user is searching for information regarding the repair of a washer or dryer, the user may have a broken washer or dryer and may need to use a Laundromat until the user's equipment is fixed. In some embodiments, the contextual information (e.g., laundry) may be associated with remote content (e.g., a web page containing information related to washer or dryer repair).

According to some embodiments, the contextual information may be associated with a word or phrase entered by the user (e.g., when he or she types a word into a search engine). For example, an advertisement for pre-paid calling card may be selected for display to the user based on a user-entered search term of "long distance phone calls".

According to some embodiments, the contextual information may be associated with another advertisement being provided to the user. For example, if a user is provided with an advertisement for a particular brand and model television, an advertisement for that same television (e.g., from another retailer) may be selected.

In some embodiments, the "supplemental" information associated with the user may comprise, for example, geographic information. By way of example, the advertising application 114 might have the capability of launching a contextual coupon based on the geographic mapping of a user's Internet Protocol (IP) address (e.g., the advertising application 114 might target a cars.com ad to users who access autoweb.com from an IP address associated with New York state).

According to other embodiments, the supplemental information is associated with user device information. For example, the type of user device (e.g., PDA or PC) might determine the advertisement that is provided to the user (or format of the advertisement).

The supplemental information might also be associated other advertising information that was previously provided to the user. For example, an advertiser might not want a user to view ten advertisements for the same product in a single day. Other examples include: minutes between two advertisements, a maximum number of impressions per target per user, a minimum number of URL's between advertisements, a maximum number of advertisements per day, a maximum number of advertisements per campaign per day, and/or a maximum number of advertisements per campaign (e.g., across the entire user base). As still another example, the supplemental information may be related to whether or not the user has already purchased an item being advertised (e.g., the user already subscribes to a particular wireless telephone service).

Figure 3:
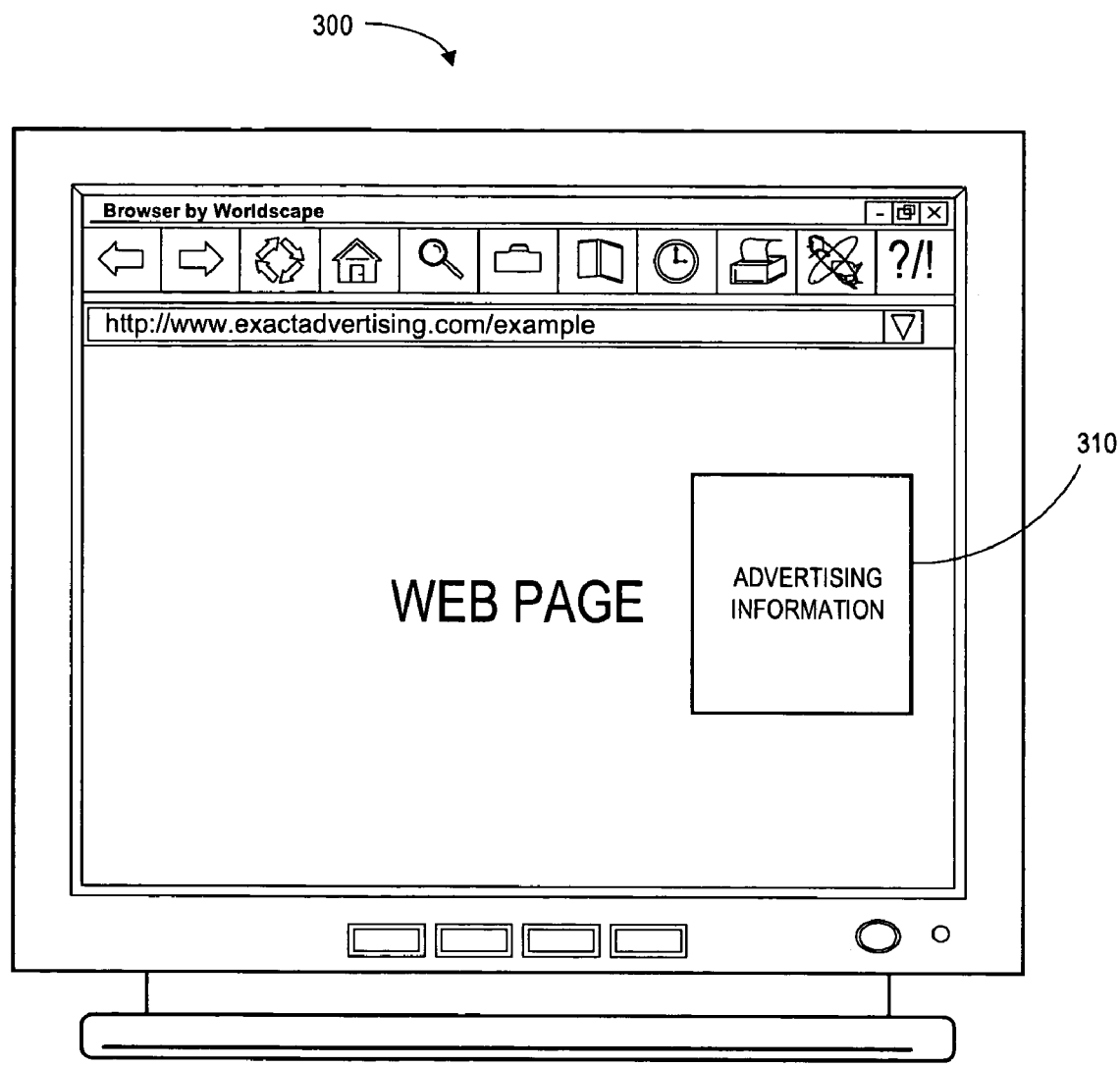
FIG. 3 illustrates a user display according to some embodiments.

At 204, it is arranged for the advertising information to be provided to the user. For example, the advertising application 114 may arrange to have the browser application 112 create a "pop-up" browser window that displays the advertising information. FIG. 3 illustrates a user display 300 including advertising information 310 according to some embodiments of the present invention. Note that the advertising information may include any combination of graphical, text, audio, and/or any other type of multimedia information. According to some embodiments, the advertising information is provided to a user device via a communication network in substantially real time. According to other embodiments, the advertising information is provided to the user device well before being displayed to the user (e.g., the advertising information might be downloaded to the user device on a nightly basis and displayed to the user during the day—even when the user device is not attached to the communication network).

User Device

Figure 4:
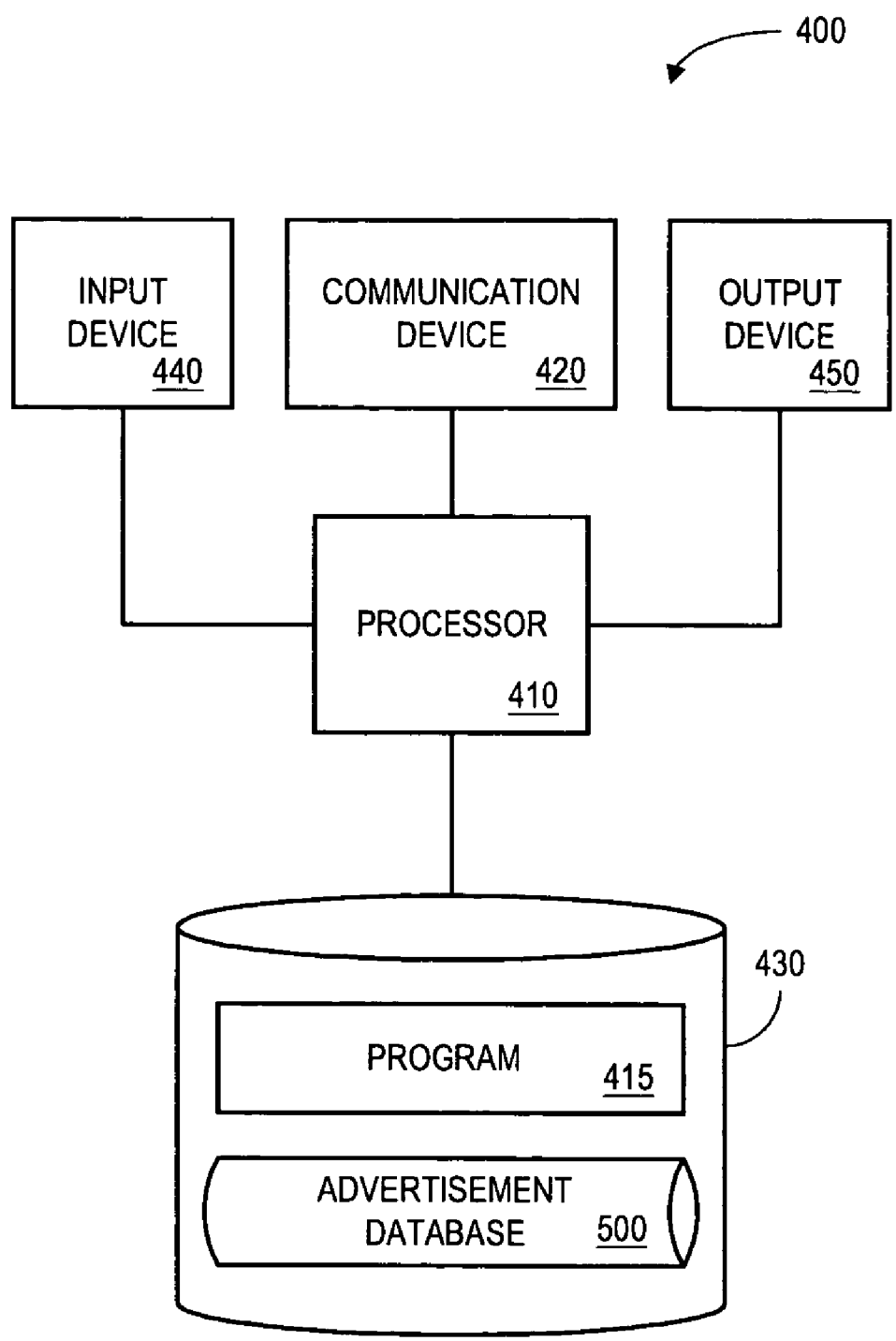
FIG. 4 is a block diagram of a user device according to some embodiments.

FIG. 4 illustrates a user device 400 that is descriptive of the device shown in FIG. 1 according to an embodiment of the present invention. The user device 400 comprises a processor 410, such as one or more INTEL® Pentium® processors, coupled to a communication device 420 configured to communicate via a communication network (not shown in FIG. 4). The communication device 420 may be used to communicate, for example, with one or more content servers 120, advertising controllers 140, and/or advertiser devices 160. The user device 400 further includes an input device 440 (e.g., a mouser and/or keyboard) and an output device 450 (e.g., a computer monitor).

The processor 410 communicates with a storage device 430. The storage device 430 may comprise any appropriate information storage device, including combinations of magnetic storage devices (e.g., a hard disk drive), optical storage devices, and/or semiconductor memory devices such as Random Access Memory (RAM) devices and Read Only Memory (ROM) devices.

The storage device 430 stores a program 415 for controlling the processor 410. The processor 410 performs instructions of the program 415, and thereby operates in accordance with the present invention. For example, the processor 410 may arrange for advertising information to be displayed to a user.

The program 415 may be stored in a compressed, uncompiled and/or encrypted format. The program 415 may furthermore include other program elements, such as an operating system, a database management system, and/or device drivers used by the processor 410 to interface with peripheral devices.

As used herein, information may be "received" by or "transmitted" to, for example: (i) the user device 400 from another device; or (ii) a software application or module within the user device 400 from another software application, module, or any other source.

As shown in FIG. 4, the storage device 430 also stores an advertisement database 500. One example of a database that may be used in connection with the user device 400 will now be described in detail with respect to FIG. 5.

Advertisement Database

Figure 5:
FIG. 5 is a portion of an advertisement database according to some embodiments.

Referring to FIG. 5, a table represents the advertisement database 500 that may be stored at the user device 400 according to an embodiment of the present invention. The table includes entries identifying advertisements that might be provided via the output device 450. The table also defines fields 502, 504, 506, 508, 510 for each of the entries. The fields specify: an advertisement identifier 502, advertisement content 504, an advertisement rule 506, time information 508, and position information 510. The information in the advertisement database 500 may be created and updated, for example, based on information received from an advertising controller 140 (e.g., on a nightly basis).

The advertisement identifier 502 may be, for example, an alphanumeric code associated with an advertisement that might be displayed to a user. The advertisement content 504 might comprise, for example, a pointer indicating from where advertisement information (e.g., text, graphic, audio, and/or executable information) can be retrieved or the information itself. The advertisement rule 506 might indicate when the advertisement should be provided to the user (e.g., based on a keyword or URL).

According to some embodiments, the time information 508 indicates a delay between the time when the advertisement rule 506 is satisfied and the time when the advertisement should be displayed. For example, an advertisement might be displayed to a user twenty seconds after he or she visits a particular web site. Such a delay could help a user realized that the advertisement is not being provided by the web site he or she is currently viewing.

Figure 6:
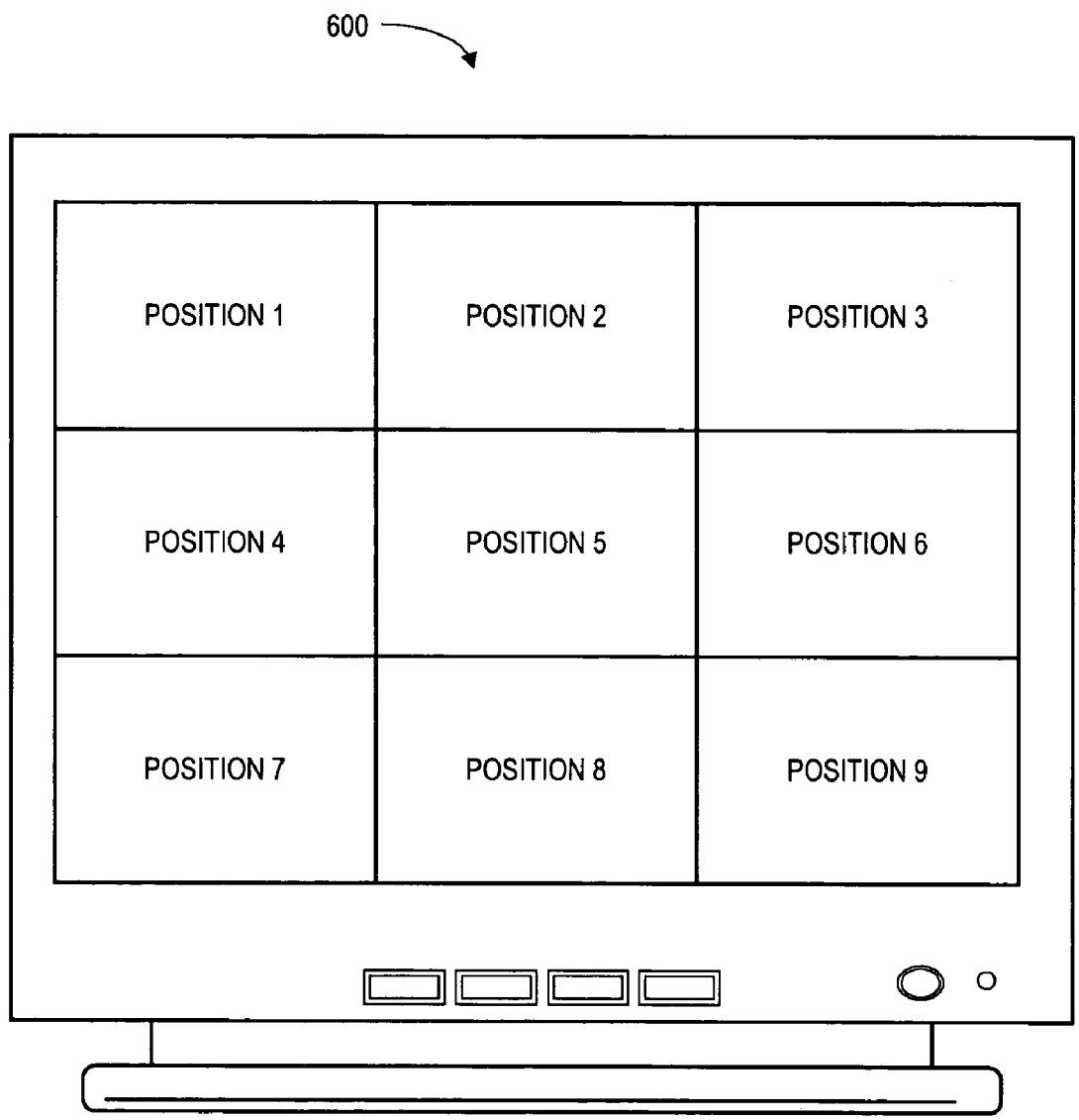
FIG. 6 illustrates a user display according to some embodiments.

Moreover, according to some embodiments the position information 510 indicates where the advertisement should be displayed. For example, FIG. 6 illustrates a user display 600 according to some embodiments of the present invention. In this case, the position information 510 indicates one of nine positions that can be used to display an advertisement to the user. In this way, an advertising application 114 or advertising controller 140 might dynamcially adjust where an advertisement is positioned (e.g., to improve results).

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

According to some embodiments, the advertising controller 140 generates reports indicating the keywords and/or URLs that have been accessed by users (e.g., so that the information can be provided to advertisers).

According to other embodiments, the advertising application 114 can change the browser header for an advertisement (e.g., at the top left corner of a browser window). The advertising application 114 might also have an advertisement to appear on top of all other browser windows on a user's desktop. According to still other embodiments, the advertising application 114 has the ability to set the style in which an advertisement will display. This might include, for example, wipe left, wipe right, pixelate, mosaic, tile, etc.

According to some embodiments, the advertising application 114 serves advertisements inside a browser widow. According to other embodiments, the advertising application 114 can serve advertisements in browser helper objects, plug-in applications (e.g. a toolbar) and/or a "free floating" banner.

The present invention has been described in terms of several embodiments solely for the purpose of illustration. Persons skilled in the art will recognize from this description that the invention is not limited to the embodiments described.

What is claimed is:

1. A method, comprising:
   receiving, at a user device, advertising information from a remote advertising controller, along with an advertising rule, default location information, and time delay information associated with the advertising information;
   locally determining at the user device contextual information associated with remote information being accessed by a user;
   locally determining at the user device that the advertising information is to be provided based on (i) the determined contextual information, (ii) supplemental information associated with the user, and (iii) the advertising rule;
   locally and dynamically calculating, by the user device, an adjusted screen display position, wherein a user screen display comprises a two-dimensional area having an x-axis and a y-axis and the default location information is adjusted along at least one of the x or y axis; and
   providing, after a delay indicated by the time delay information, the determined advertising information from the user device to the user via the screen display at the adjusted screen display position.

2. The method of claim 1, wherein the supplemental information is associated with at least one of: (i) geographic information, (ii) user device information, or (iii) other advertising information that has been provided to the user.

3. The method of claim 1, wherein said receiving is associated with:
   receiving the advertising information at the user device via a communication network; and
   providing the advertising information from the user device to the user when the user device is not communicating via the communication network.

4. The method of claim 1, wherein the contextual information comprises at least one of: (i) a key word, (ii) a search term, or (iii) uniform resource locator information.

5. An apparatus, comprising:
   a processor; and
   a storage device in communication with said processor and storing instructions adapted to be executed by the processor to:
   receive advertising information from a remote advertising controller, along with an advertising rule, default location information, and time delay information associated with the advertising information;
   locally determine contextual information associated with remote information being accessed by a user;
   locally determine that the advertising information is to be provided based on (i) the determined contextual information, (ii) supplemental information associated with the user, and (iii) the advertising rule;
   locally and dynamically calculating an adjusted screen display position, wherein the screen display comprises a two dimensional area having an x-axis and a y-axis and the default location information is adjusted along at least one of the x or y axis based at least in part on the received location information;
   locally and dynamically calculating an adjusted screen display position, wherein a user screen display comprises a two dimensional area having an x-axis and a y-axis and the default location information is adjusted along at least one of the x or y axis; and
   provide, after a delay indicated by the time delay information, the determined advertising information to the user at the adjusted screen display position.

6. The apparatus of claim 5, wherein the supplemental information is associated with at least one of: (i) geographic information, (ii) user device information, or (iii) other advertising information that has been provided to the user.

7. The apparatus of claim 5, wherein the advertising information is received at the apparatus from a communication network and is provided to the user when the user device is not communicating via the communication network.

8. The apparatus of claim 5, wherein the contextual information comprises at least one of: (i) a key word, (ii) a search term, or (iii) uniform resource locator information.

9. A computer-readable medium storing instructions adapted to be executed by a processor to perform a method, said method comprising:

receiving, at a user device, advertising information from a remote advertising controller, along with an advertising rule, default location information, and time delay information associated with the advertising information;

locally determining at the user device contextual information associated with remote information being accessed by a user;

locally determining, at the user device, supplemental information associated with the user, wherein the supplemental information includes information about products previously advertised to the user;

locally determining at the user device that the advertising information is to be provided based on (i) the determined contextual information, (ii) the supplemental information associated with the user, and (iii) the advertising rule;

locally and dynamically calculating, by the user device, an adjusted screen display position, wherein a user screen display comprises a two dimensional area having an x-axis and a y-axis and the default location information is adjusted along at least one of the x or y axis; and providing, after a delay indicated by the time delay information, the determined advertising information from the user device to the user via the screen display at the adjusted screen display position.

10. The medium of claim 9, wherein the supplemental information is associated with at least one of: (i) geographic information, (ii) user device information, or (iii) other advertising information that has been provided to the user.

11. The medium of claim 9, wherein the advertising information is received at the user device via a communication network and is provided to the user when the user device is not communicating via the communication network.

* * * * *